United States Patent
Long

(10) Patent No.: US 8,656,803 B2
(45) Date of Patent: Feb. 25, 2014

(54) MECHANICAL JOINT

(75) Inventor: Bo Long, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 648 days.

(21) Appl. No.: 12/973,885

(22) Filed: Dec. 20, 2010

(65) Prior Publication Data

US 2011/0271786 A1    Nov. 10, 2011

(30) Foreign Application Priority Data

May 4, 2010   (CN) .......................... 2010 1 0161423

(51) Int. Cl.
*B25J 17/00*     (2006.01)
*B25J 17/02*     (2006.01)
*B25J 18/00*     (2006.01)

(52) U.S. Cl.
USPC ........................ 74/490.05; 74/490.01; 901/28

(58) Field of Classification Search
USPC ............. 74/490.01, 490.05, 490.06; 384/517, 384/518, 563, 611, 612; 901/15, 19, 25, 901/27–29, 49
See application file for complete search history.

(56) References Cited

U.S. PATENT DOCUMENTS

| | | | |
|---|---|---|---|
| 4,577,981 A | | 3/1986 | Kimura |
| 4,655,616 A | * | 4/1987 | Ducan .......................... 384/446 |
| 4,661,038 A | * | 4/1987 | Kohler et al. .................. 414/730 |
| 4,798,523 A | * | 1/1989 | Glaser et al. ................... 417/407 |
| 5,564,840 A | * | 10/1996 | Jurras et al. .................... 384/517 |
| 5,738,469 A | * | 4/1998 | Hsu ................................ 408/139 |
| 6,042,273 A | * | 3/2000 | Thrasher ....................... 384/517 |
| 2004/0245005 A1 | * | 12/2004 | Toyama et al. ................. 173/48 |

FOREIGN PATENT DOCUMENTS

CN            201020718 Y     2/2008

* cited by examiner

*Primary Examiner* — Troy Chambers
*Assistant Examiner* — Jake Cook
(74) *Attorney, Agent, or Firm* — Altis Law Group, Inc.

(57) ABSTRACT

A mechanical joint includes a first axial bracket, a first bearing, a second bearing, a sleeve, a second axial bracket, and an anti-jamming mechanism. The first axial bracket includes a rotary shaft. The first bearing, the second bearing, and the sleeve sleeve on the rotary shaft of the first axial bracket in turn, the sleeve being sandwiched between the first and second bearings. The second axial bracket is rotatably assembled to the first axial bracket via the first and second bearings. The anti-jamming mechanism is resiliently assembled within the second axial bracket and sleeves on the sleeve. One end of the anti-jamming mechanism resists the second axial bracket and the opposite second bearing.

11 Claims, 4 Drawing Sheets

MECHANICAL JOINT

BACKGROUND

1. Technical Field

The present disclosure relates to robotics, and particularly, to a mechanical joint applied to an arm of an industrial robot.

2. Description of Related Art

Industrial robots are widely applied in many fields such as industrial manufacturing, repair, checking, and the like, to replace manual labor. The industrial robot generally includes an arm with a mechanical joint being a key part thereof.

A commonly used mechanical joint includes a first axial bracket, a sleeve, a first bearing, a second bearing, and a second axial bracket. The sleeve, and the first and second bearing sleeve on the first axial bracket, with the first and second bearing respectively resist opposite ends of the sleeve. The second axial bracket sleeves on the first and second bearings, such that the second axial bracket is rotatably assembled with the first axial bracket.

However, when the aforementioned mechanical joint is in use, it seizes easily due to asymmetrical force on the second bearing.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the mechanical joint. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
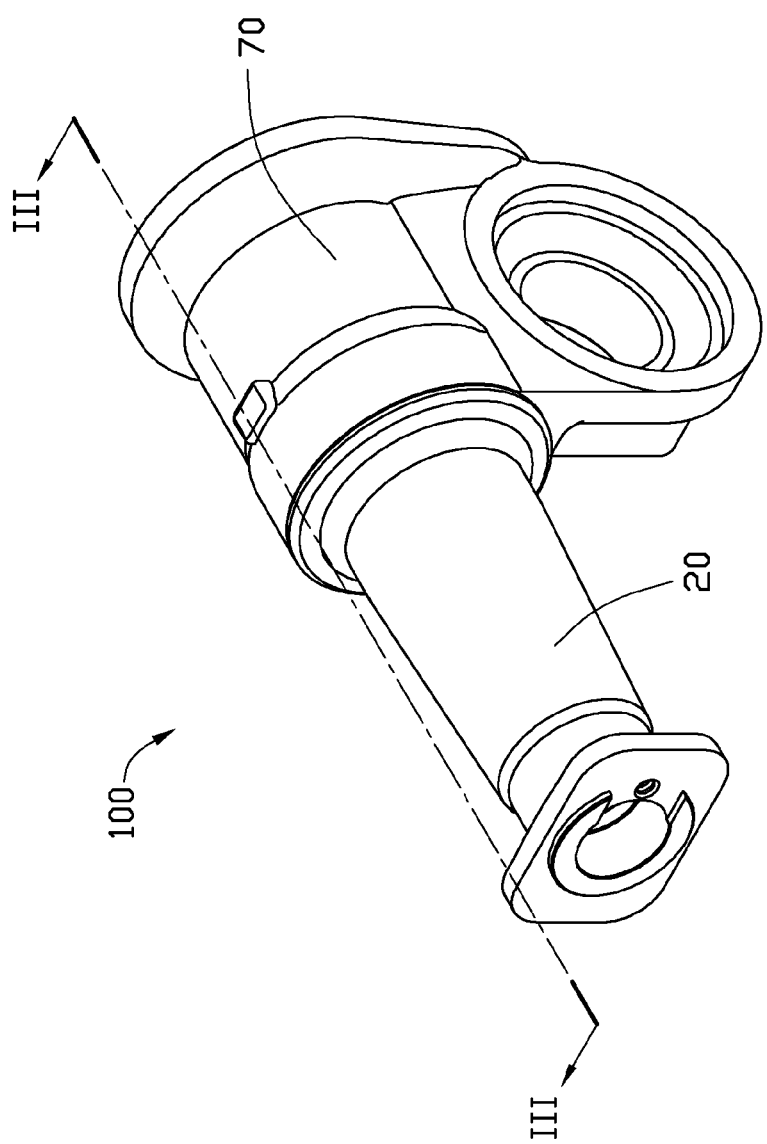
FIG. 1 is an assembled isometric view of an embodiment of a mechanical joint.
Figure 2:
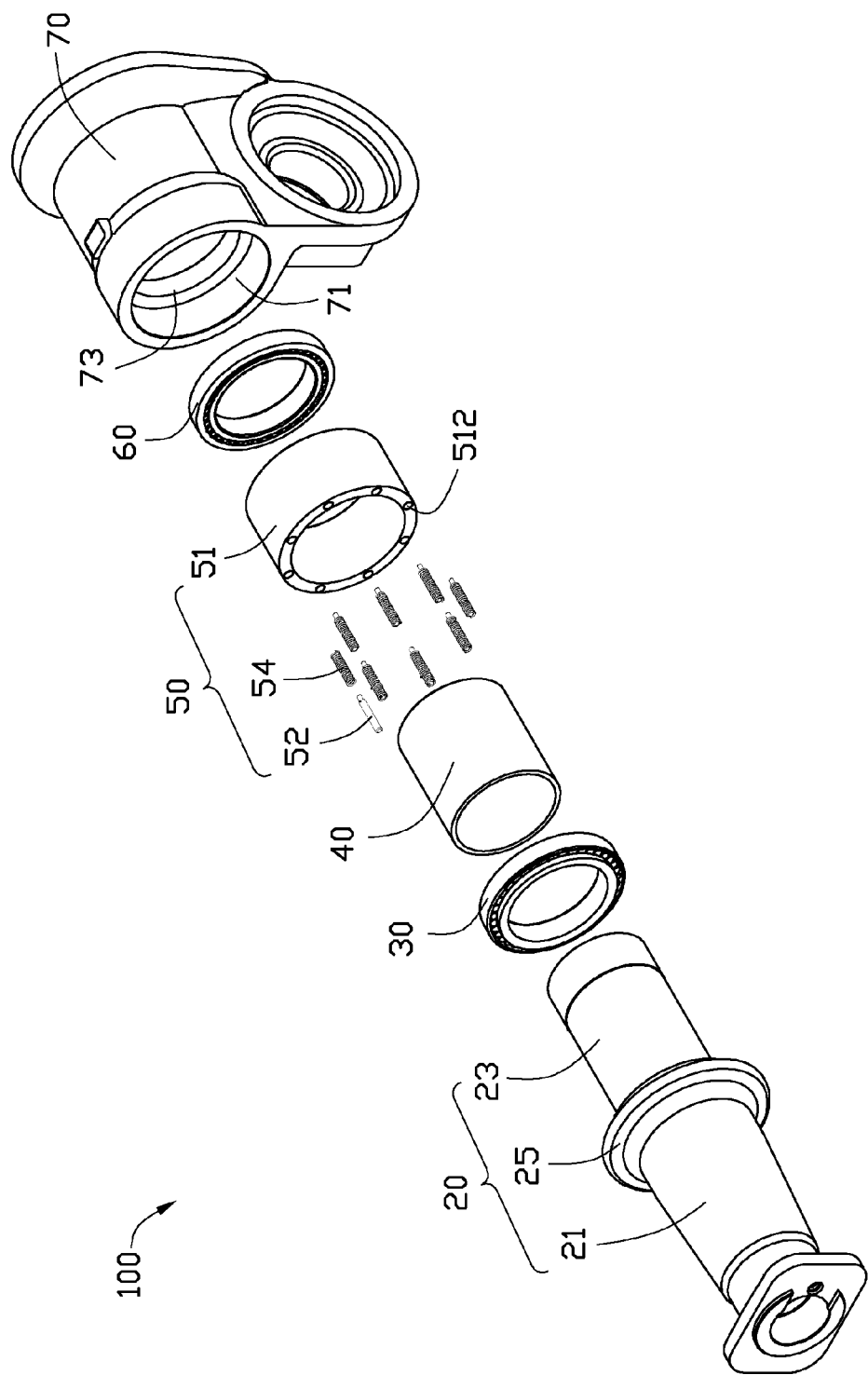
FIG. 2 is an exploded isometric view of the mechanical joint shown in FIG. 1.

Referring to FIGS. 1 and 2, an embodiment of a mechanical joint 100 includes a first axial bracket 20, a first bearing 30, a sleeve 40, an anti-jamming mechanism 50, a second bearing 60, a second axial bracket 70, and a driving gear 80. The second axial bracket 70 is rotatably assembled to the first axial bracket 20 via the first bearing 30 and the second bearing 60. The sleeve 40 sleeves on the first axial bracket 20 and is sandwiched between the first bearing 30 and the second bearing 60. The anti-jamming mechanism 50 is resiliently assembled within the second axial bracket 70 and sleeves on the sleeve 40. One end of the anti-jamming mechanism 50 resiliently resists the second axial bracket 70, and the opposite end of the anti-jamming mechanism 50 resists the second bearing 60.

The first axial bracket 20 includes a main body 21, a rotary shaft 23, and an outer flange 25. The main body 21 is substantially tapered. The rotary shaft 23 is substantially cylindrical and coaxially connected to the main body 21. The outer flange 25 is substantially annular and formed around a joint of the main body 21 and the rotary shaft 23.

The sleeve 40 is a substantially hollow cylinder and sleeves on the rotary shaft 23 of the first axial bracket 20. The first bearing 30 and the second bearing 60 both sleeve on the rotary shaft 23 of the first axial bracket 20, and respectively resist opposite ends of the sleeve 40. In the illustrated embodiment, the first bearing 30 and the second bearing 60 are both tapered roller bearings.

The anti-jamming mechanism 50 is resiliently assembled within the second axial bracket 70 and sleeves on the first axial bracket 20 together with the sleeve 40. The anti-jamming mechanism 50 is located between the first and second bearings 30, 60, to prevent the second bearing 60 from blocking relative to the first bearing 30. In the illustrated embodiment, the anti-jamming mechanism 50 sleeves on the sleeve 40 and is assembled to the first axial bracket 20 together with the sleeve 40. The anti-jamming mechanism 50 includes a guide member 51, a plurality of limiting members 52, and a plurality of resilient members 54. The guide member 51 is substantially hollow and cylindrical and sleeves on the sleeve 40. A plurality of stepped holes 512 is separately and axially defined in one cross-section of the guide member 51. The diameter of each stepped hole 512 decreases toward the opposite distal end of the guide member 51.

Figure 3:
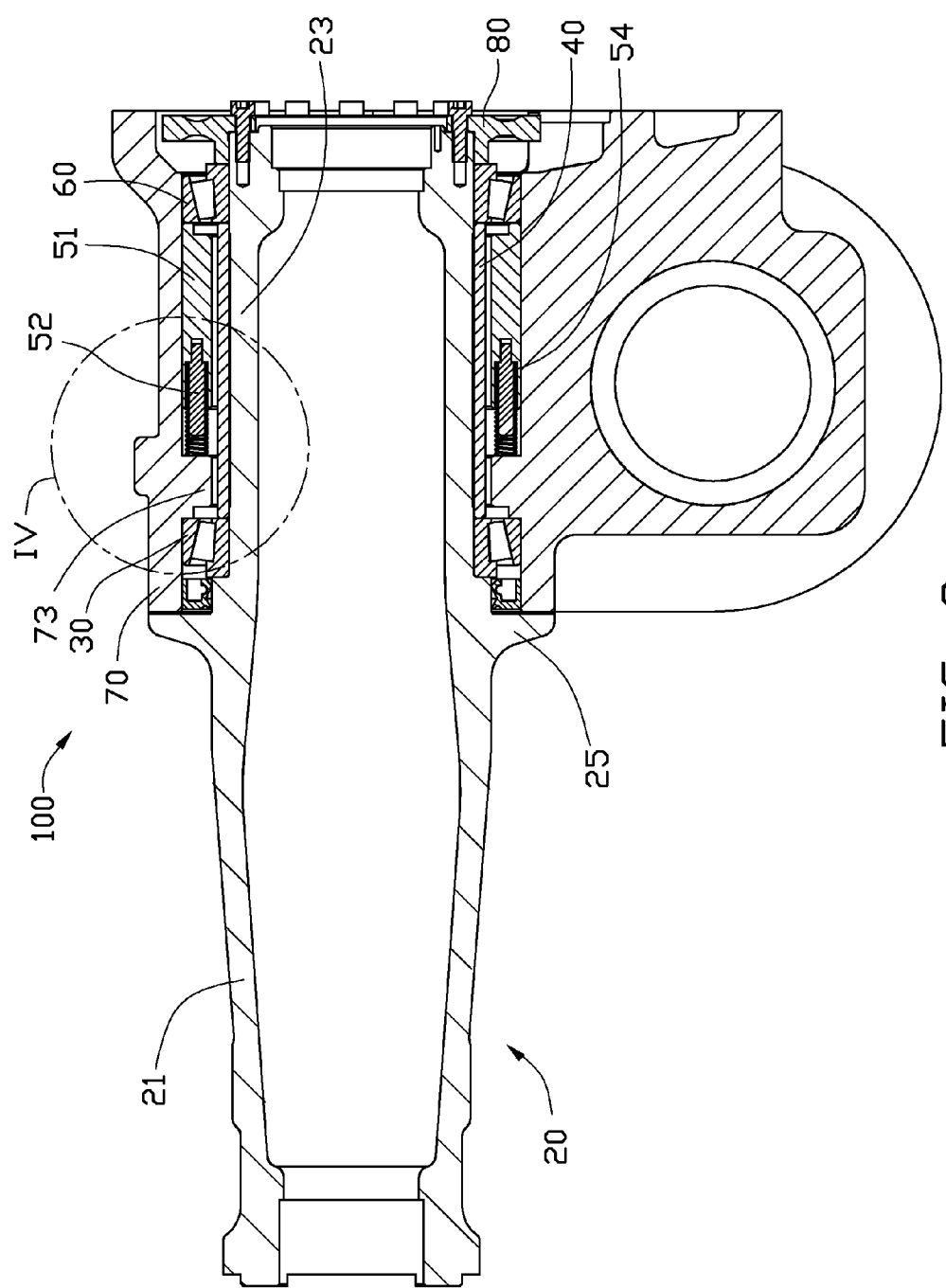
FIG. 3 is a cross-sectional view taken along line of FIG. 1.

Also referring to FIG. 3, in the illustrated embodiment, each limiting member 52 is a limiting shaft, and includes a shaft portion 521 and a fixing portion 524 coaxially formed at a distal end of the shaft portion 521. The fixing portion 524 of the limiting member 52 is inserted into and fixed within the corresponding stepped hole 512 of the guide member 51. The opposite shaft portion 521 of the limiting member 52 is partially exposed from the stepped hole 512.

Each resilient member 54 is a cylindrical coil spring in the illustrated embodiment and sleeves on the corresponding shaft portion 521 of one limiting member 52 and partially received within the stepped hole 512 of the guide member 51. An original length of each resilient member 54 is longer than the shaft portion 521 of the limiting member 52 such that as the limiting member 52 is fixed to the guide member 51, the distal end of each resilient member 54 together with the distal end of the corresponding shaft portion 521 of the limiting member 52 is exposed to outside of the guide member 51.

Figure 4:
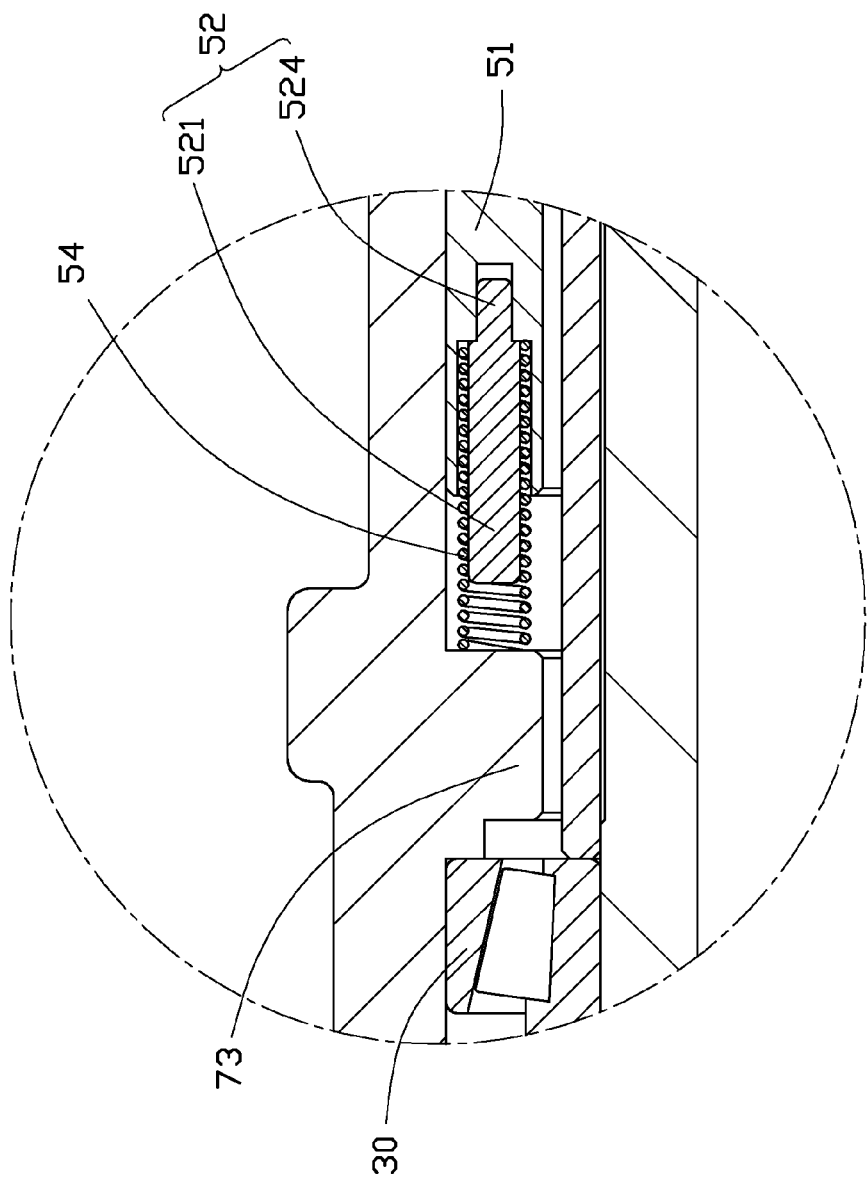
FIG. 4 is an enlarged view of a circled portion IV of FIG. 3.

Also referring to FIG. 4, the second axial bracket 70 is rotatably assembled to corresponding first and second bearings 30, 60. The second axial bracket 70 defines a receiving axial hole 71 therethrough for rotatably receiving the rotary shaft 23 of the first axial bracket 20, and receiving the corresponding first bearing 30, the sleeve 40, the anti-jamming mechanism 50, and the second bearing 60. An inner flange 73 is substantially annular and formed within the receiving axial hole 71 adjacent to one end thereof, thereby dividing the receiving axial hole 71 into two parts.

The driving gear 80 sleeves on the distal end of the rotary shaft 23 of the first axial bracket 20 and resists the corresponding second bearing 60.

During assembly of the mechanical joint 100, the first bearing 30 sleeves on the rotary shaft 23 of the first axial bracket 20 and resists the outer flange 25 of the first axial bracket 20. Then, the sleeve 40 sleeves on the rotary shaft 23 and resists the first bearing 30. Next, the rotary shaft 23 of the first axial bracket 20 together with the first bearing 30 and the sleeve 40 aligns with and passes through the receiving axial hole 71 of the second axial bracket 70. The outer flange 25 of the first axial bracket 20 covers and envelops one end of the receiving axial hole 71 of the second axial bracket 70, such that the first bearing 30 is sandwiched between the outer flange 25 of the first axial bracket 20 and the inner flange 73 of the second axial bracket 70. The sleeve 40 sleeves on the rotary shaft 23 and is received within the receiving axial hole 71 of the second axial bracket 70. The anti-jamming mechanism 50 sleeves on the sleeve 40 coaxial with the rotary shaft 23 of the first axial bracket 20 from the other end of the receiving axial hole 71 of the second axial bracket 70 and is received within the receiving axial hole 71.

The distal end of the plurality of resilient members 54 elastically resists the inner flange 73 of the second axial bracket 70, thereby forming a clearance between the inner flange 73 and the distal end of the shaft portion 521 of the limiting member 52. The second bearing 60 sleeves on the rotary shaft 23 of the first axial bracket 20 and resists the opposite end of the sleeve 40 and the distal end of the guide member 51, such that the sleeve 40 is sandwiched between the first and second bearings 30, 60. Finally, the driving gear 80 sleeves on the distal end of the rotary shaft 23 of the first axial bracket 20 and resists the corresponding second bearing 60 to finish the assembly of the mechanical joint 100.

It is to be understood that the clearance between the inner flange 73 and the distal end of the shaft portion 521 of the limiting member 52 is less than the axial distance between the driving gear 80 and the second axial bracket 70, such that as the limiting member 52 resists the inner flange 73, the driving gear 80 does not resist the inner wall of the second axial bracket 70. In the preferred embodiment, the clearance is substantially 0.25 mm. Because the second bearing 60 resists the distal end of the guide member 51 as the second bearing 60 experiences an outer force, the second bearing 60 may transfer the force to the guide member 51 and urge the guide member 51 to slide toward the first bearing 30 and compress the resilient member 54, such that the second bearing 60 will not be stuck with the first bearing 30.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mechanical joint, comprising:
a first axial bracket comprising a rotary shaft and an outer flange formed at one end of the rotary shaft;
a first bearing;
a second bearing;
a sleeve sleeved on the first axial bracket together with the first and second bearings, and sandwiched between the first and second bearings;
a second axial bracket rotatably assembled to the first axial bracket via the first and second bearings, the second axial bracket defining a receiving axial hole and having an inner flange formed within the receiving axial hole, thereby dividing the receiving axial hole into two parts; and
an anti-jamming mechanism resiliently assembled within the receiving axial hole of the second axial bracket and located between the first and second bearings, wherein one end of the anti-jamming mechanism resists the inner flange, and the opposite end of the anti-jamming mechanism resisting the second bearing;
wherein the first bearing, the sleeve and the second bearing sleeve on the rotary shaft in turn, and the first bearing resists the outer flange;
wherein the anti-jamming mechanism comprises a guide member and a plurality of resilient members resiliently assembled at one end of the guide member; the guide member is a substantially hollow cylinder and sleeves on the sleeve, and the distal end of the resilient members resist the inner flange of the second axial bracket; the guide member defines a plurality of stepped holes in one cross-section thereof, and the plurality of resilient members are respectively assembled in the stepped holes and partially exposed to an outer side of the guide member and resist the inner flange of the second axial bracket.

2. The mechanical joint of claim 1, wherein the anti-jamming mechanism further comprises a plurality of limiting members respectively inserted into and fixed within the corresponding stepped holes of the guide member, and the resilient members are coil springs respectively sleeving on corresponding limiting members.

3. The mechanical joint of claim 2, wherein the diameter of each stepped hole decreases along an axial direction toward the opposite distal of the guide member.

4. The mechanical joint of claim 3, wherein each limiting member is a limiting shaft, and includes a shaft portion and a fixing portion coaxially formed at a distal end of the shaft portion, the fixing portion of the limiting member is inserted into and fixed within the corresponding stepped hole of the guide member, and the opposite shaft portion of the limiting member is partially exposed from the corresponding stepped hole.

5. The mechanical joint of claim 1, further comprising a driving gear sleeved on the distal end of the rotary shaft of the first axial bracket and resisting the corresponding second bearing.

6. The mechanical joint of claim 1, wherein the first axial bracket further comprises a substantially tapered main body coaxially connected with the rotary shaft, and the outer flange is substantially annular and formed at the joint of the main body and the rotary shaft.

7. A mechanical joint, comprising:
a first axial bracket having a rotary shaft;
a first hearing;
a second bearing;
a sleeve sleeved on the rotary shaft of the first axial bracket together with the first and second bearings, and sandwiched between the first and second bearings;
a second axial bracket rotatably assembled to the first axial bracket via the first and second bearings; and
an anti-jamming mechanism resiliently assembled within the second axial bracket and sleeved on the sleeve, wherein one end of the anti-jamming mechanism resisting the second axial bracket, and the opposite end of the anti-jamming mechanism resists the second bearing;
wherein the first axial bracket further comprises a main body and an outer flange, the main body coaxially connects with the rotary shaft, the outer flange is formed at the joint of the main body and the rotary shaft; the first bearing resists the outer flange;
wherein the second axial bracket defines a receiving axial hole and has an inner flange formed within the receiving axial hole, the second axial bracket sleeves on the rotary shaft of the first axial bracket, the rotary shaft together with the first bearing, the sleeve, the second bearing, and the anti-jamming mechanism is received within the receiving axial hole of the second axial bracket, and two ends of the anti-jamming mechanism respectively resist the inner flange and the second bearing;
wherein the anti-jamming mechanism comprises a guide member and a plurality of resilient members, the guide member sleeves on the sleeve, and the resilient members are resiliently sandwiched between the guide member and the inner flange of the second axial bracket; the guide member defines a plurality of stepped holes in one cross-section thereof, and the plurality of resilient members are respectively assembled in the stepped holes and partially exposed to an outer side of the guide member and resist the inner flange of the second axial bracket.

8. The mechanical joint of claim 7, wherein the anti-jamming mechanism further comprises a plurality of limiting members respectively with ends thereof fixed within corresponding stepped holes of the guide member, and the resilient members are coil springs respectively sleeved on corresponding limiting, members.

9. The mechanical joint of claim 8, wherein the diameter of each stepped hole decreases along an axial direction toward the opposite distal end of the guide member.

10. The mechanical joint of claim 9, wherein each limiting member is a limiting shaft, and includes a shaft portion and a fixing portion coaxially formed at a distal end of the shaft portion, the fixing portion of the limiting member is inserted into and fixed within the corresponding stepped hole of the guide member, and the opposite shaft portion of the limiting member is partially exposed from stepped hole.

11. The mechanical joint of claim 10, wherein the mechanical joint further comprises a driving gear sleeved on the distal end of the rotary shaft of the first axial bracket and resisting the second bearing.

\* \* \* \* \*